May 30, 1972   KAZUYOSHI NAGAO   3,666,587
METHOD OF MAKING A LAMINATED LIGHT-CONDUCTING FIBER MATERIAL
Filed Sept. 29, 1969

INVENTOR
KAZUYOSHI NAGAO

BY Noble J. Williams
ATTORNEY

United States Patent Office
3,666,587
Patented May 30, 1972

3,666,587
METHOD OF MAKING A LAMINATED LIGHT-CONDUCTING FIBER MATERIAL
Kazuyoshi Nagao, Yokohama, Japan, assignor to American Optical Corporation, Southbridge, Mass.
Filed Sept. 29, 1969, Ser. No. 861,871
Int. Cl. B31f 1/00
U.S. Cl. 156—199
4 Claims

ABSTRACT OF THE DISCLOSURE

Plastic light-conducting fiber ribbons are formed of a transparent high refractive index strip of plastic material covered with thin films of relatively low refractive index plastic material. The covered strip is heated and rolled to the configuration of a multiplicity of interconnected juxtaposed fibers from which monofilaments may be cut longitudinally of the ribbon.

BACKGROUND OF THE INVENTION

Field of the invention

Fiber optics with particular reference to individually clad light-conducting fibers formed of rolled plastic materials.

Description of the prior art

Current demands for optical fiber are accompanied by requirements for greater fiber flexibility and lower production cost. The glass optical fiber being relatively expensive to manufacture and also having the inherent drawback of being fragile has prompted the use of extruded plastic fibers. High temperatures required for extrusion, however, tend to carbonize plastic fiber materials and impair their optical quality.

Accordingly, it is an object of this invention to provide for the manufacture of highly flexible plastic fibers with accurate and rapid reproducibility and a minimum of impairment of optical quality through th use of low plastic-forming temperatures.

SUMMARY OF THE INVENTION

According to the present invention a strip of transparent plastic material having a high refractive index is covered by thin films of low refractive index plastic material and rolled at a minimum softening temperature longitudinally into the configuration of a ribbon of juxtaposed fiber elements from which monofilaments may be formed by cutting long lines of division between the fiber elements.

Details of the present inventive concept will be more fully understood by reference to the following description when taken in conjunction with the accompanying drawing.

DESCRIPTION OF THE PREFERRED EMBODIMENTS

Figure 1:
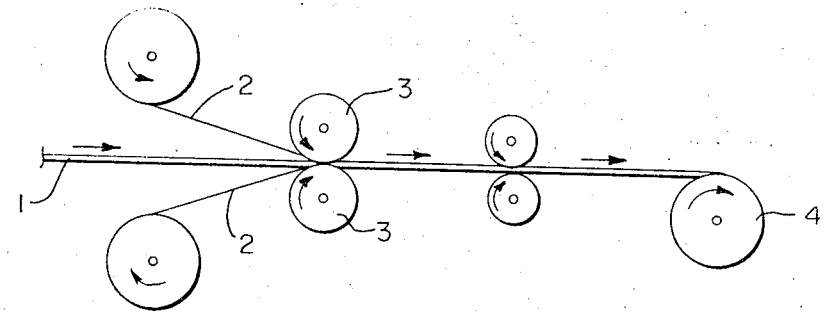
FIG. 1 is a schematic illustration of a system for forming fiber optical components according to the present inventive concept.

In the optical fiber forming system illustrated by FIG. 1, fiber core material 1 in the form of a strip of plastic material such as polystyrene resin is directed through a pair of shaping rollers 3 between thin films 2 of, for example, an acrylic resin. Rollers 3 are heated to a temperature substantially no greater than that required for softening core material 1 and films 2 sufficiently to permit shaping thereof by rollers 3 and fusion of the films to core material 1. The resulting multifiber ribbon is directed from rollers 3 onto winding drum 4 for storage.

Figure 2:
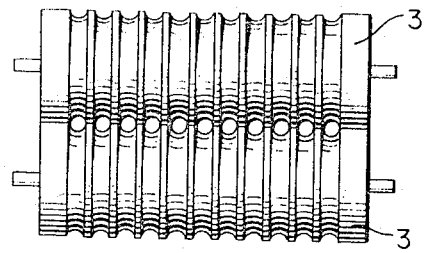
FIG. 2 is an elevational view of one type of plastic forming rollers useful in the system of FIG. 1.
Figure 3:
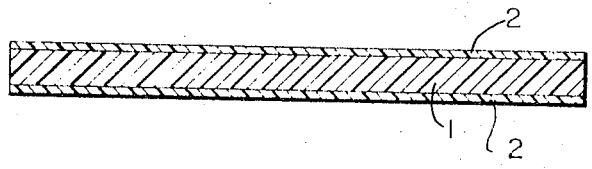
FIG. 3 is a cross-sectional view of a strip of plastic material used in the system of FIG. 1, the illustration being exemplary of the cross-sectional configuration of the material immediately prior to rolling thereof.

Immediately prior to entering rollers 3, core material 1 and films 2 appear substantially as illustrated in FIG. 3. In passing through rollers 3 of the type illustrated in FIG. 2, the materials are formed to a cross-sectional shape resembling that shown in FIG. 4 wherein the core material 1 is segregated into fiber elements each completely surrounded by the materials of films 2. The relatively low refractive index of films 2 renders each separated portion of core material 1 highly conductive to light by the principles of total internal reflection and useful as a light-conducting fiber.

Figure 5:
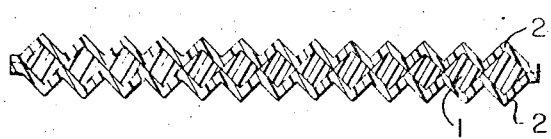
FIG. 5 is a cross-sectional view of a strip of plastic material of a different cross-sectional configuration which may be produced according to the present inventive concept.

A multifiber ribbon having a rectilineal cross-sectional configuration is illustrated in FIG. 5. Such a ribbon is formed simply by using rollers 3 which are provided with a series of mated circumferential grooves each having the configuration of corresponding opposite side surfaces of the multifiber ribbon shown in FIG. 5.

Figure 4:
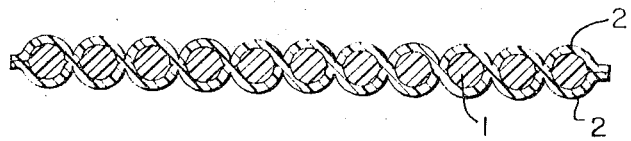
FIG. 4 illustrates one cross-sectional configuration which may be imparted to strips of plastic material according to the present inventive concept.
Figure 6:
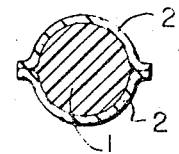
FIG. 6 and 7 are enlarged cross-sectional views of light-conducting monofilaments which may be cut from plastic strips of the types illustrated in FIGS. 4 and 5.
Figure 7:
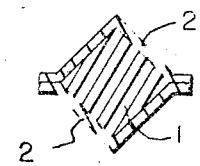

Multifiber bundles may be formed by stacking and fusing or cementing together a preselected number of ribbons such as those illustrated in FIG. 4 or 5. Alternatively, monofilaments such as are illustrated in FIGS. 6 and 7 may be cut from correspondingly shaped fiber ribbons.

In the manufacture of fiber optical image transmitting devices, conventional glass optical fibers are fragile and difficult to handle while the present form of optical fiber, having exceptional flexibility, will readily conform to sinuous shapes such as are encountered in the manufacture of circle-to-line-converters, for example.

I claim:
1. The method of making light-conducting fiber material comprising the steps of:
   directing a strip of high-refractive index transparent plastic material having a film of lower refractive index material on each of opposite sides thereof between a pair of heated shaping rollers having a series of juxtaposed mated circumferential grooves, said grooves being of the cross-sectional size and shape desired of individual light-conducting fibers of the material; and rolling the length of said plastic strip and films to the cross-sectional shape of said grooves to fuse said films to said strip and shape the combination of said strip and films into the configuration of an elongated ribbon of interconnected fibers of said high refractive index strip material each surrounded by the materials of said lower refractive index films.

2. The method according to claim 1 wherein said films are directed toward and against said strip of high refractive index material immediately prior to passage thereof between said rollers.

3. The method according to claim 1 wherein said strip of high refractive index material is a polystyrene resin and said films are formed of an acrylic resin.

4. The method according to claim 1 wherein said ribbon is cut along lines between said fibers to separate same as monofilaments.

References Cited
UNITED STATES PATENTS 2,946,713    7/1960    Dusina et al. _____ 156—219 X
2,962,406    11/1960    Rosa _____ 156—219

CARL D. QUARFORTH, Primary Examiner

S. J. LECHERT, JR., Assistant Examiner

U.S. Cl. X.R.

156—219, 222, 271, 309